United States Patent

[11] 3,617,809

[72] Inventors Thomas C. Penn
Richardson, Tex.;
Arthur L. Reenstra, Attleboro, Mass.
[21] Appl. No. 37,560
[22] Filed May 15, 1970
[45] Patented Nov. 2, 1971
[73] Assignee Texas Instruments Incorporated
Dallas, Tex.

[54] ELECTRONIC SAFETY SYSTEM
19 Claims, 8 Drawing Figs.
[52] U.S. Cl. .................................................. 317/18 D,
317/27 R, 317/33 SC, 317/148.5 B, 323/89 C
[51] Int. Cl. .................................................. H02h 3/28
[50] Field of Search .................................... 317/18 D,
27 R, 33 SC, 148.5 B; 323/75 S, 89 B, 89 C

[56] References Cited
UNITED STATES PATENTS
| | | | |
|---|---|---|---|
| 2,700,125 | 1/1955 | King et al. ..................... | 317/18 D |
| 3,202,875 | 8/1965 | Bateman ....................... | 317/18 D |
| 3,296,493 | 1/1967 | Whittaker et al. ............. | 317/18 D |
| 3,407,337 | 10/1968 | Benham ....................... | 317/18 D |

FOREIGN PATENTS
| | | | |
|---|---|---|---|
| 828,218 | 2/1960 | Great Britain ................. | 317/18 D |

Primary Examiner—James D. Trammell
Attorneys—Harold Levine, Edward J. Connors, Jr., John A. Haug, James P. McAndrews and Gerald B. Epstein ABSTRACT: An electronic safety system is disclosed for detecting leakage of electrical signals from a load circuit to ground in order to selectively disrupt the supply of power to the load circuit. A pair of electrical conductors couple the load circuit to the source of power. At least a portion of the pair of electrical conductors intermediate the load circuit and the power supply comprises a section of coaxial electrical cable inductively coupled to a selectively energizable saturable core magnetic means, which is connected to an energizing circuit adapted to establish a magnetic field within the saturable core magnetic means. Means are coupled to the saturable core magnetic means for sensing affects on the magnetic field generated by the presence of unequal currents in the section of the coaxial cable inductively coupled to the saturable core magnetic means, such unequal currents being due to the leakage of current from one of the conductors to ground. Such affects are arranged to produce an electrical output signal, which may be utilized for effecting operation of a circuit breaker to disrupt the power being supplied to the load.

Inventors:
Thomas C. Penn,
Arthur L. Reenstra,
by Gerald B. Epstein
Att'y.

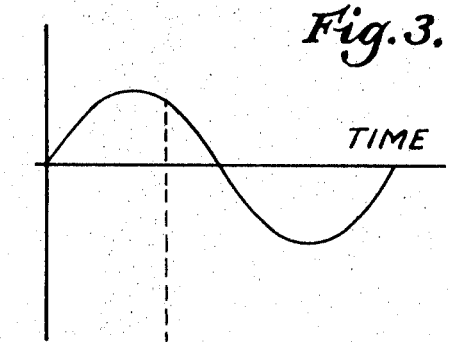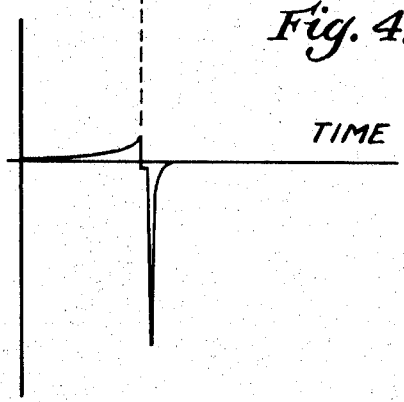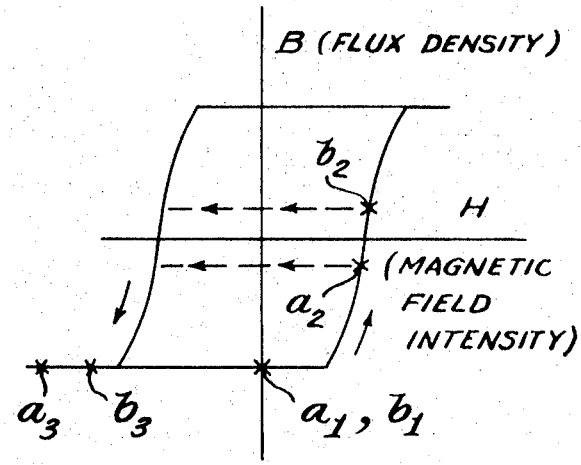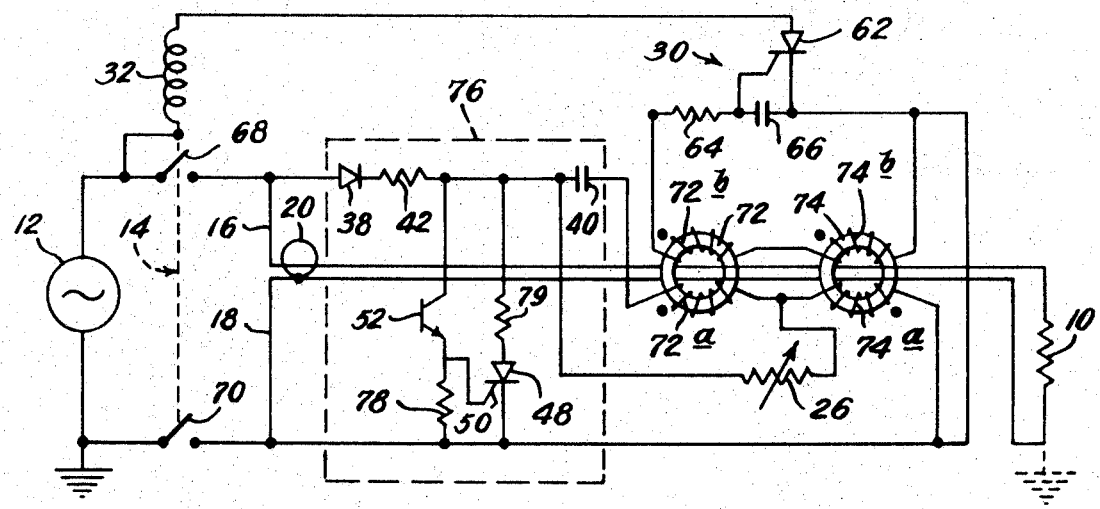

Inventors:
Thomas C. Penn,
Arthur L. Reenstra,
by Gerald B. Epstein
Att'y.

ELECTRONIC SAFETY SYSTEM

The present invention relates generally to safety systems and more particularly is directed to an improved electronic safety system for detecting the presence of ground leakage signals from a load circuit.

As the usage of various types of electrical equipment in the home and industry has dramatically risen in recent years an increasing awareness has simultaneously arisen in regard to the previously unquestioned safety aspects associated with the usage of such equipment. For example, in the health care field in hospitals, nursing homes, etc., continually more sophisticated electronic equipment has become available for monitoring various bodily functions of a patient in order to provide expanded diagnostic information, as well as to free personnel for other duties. In such instances, the electrical equipment may be in electrical contact with the patient under surveillance for prolonged periods of time often without the presence of an operator or attendant. In addition, the patient may be in an extremely weakened condition due to advanced age, illness, etc. and is frequently unconscious while in contact with the electronic equipment. These circumstances have created an intense concern for the safety of individuals exposed to contact with such equipment. Furthermore, in recent years increased emphasis has been placed upon an extended lifetime for electrical equipment and appliances. As a result of utilization for a prolonged period of time there is an increased likelihood of minor electrical faults developing in the equipment, which faults may not significantly affect operation and often remain undetected due to the extremely high degree of complexity and the lack of skilled personnel for continually maintaining the equipment. Thus, various faults may be present in electronic equipment which result in the leakage of electrical current to ground. Moreover, even when equipment is not subject to electrical faults, a certain amount of electrical leakage current to ground may nevertheless be present due to improper electrical design, improper usage, deterioration caused by environmental factors, etc.

Although various types of electrical safety systems are utilized throughout the world, such equipment is often totally unsatisfactory for providing the requisite degree of protection. Typically, safety equipment utilized in average home electrical distribution circuits, for example, protects against overcurrents, which may result from short circuits or the like, and often comprises 15 to 20 ampere rated circuit breakers or fuses. Thus, when electronic equipment being supplied by the circuit is subjected to a disastrous fault, such as a short circuit, leading to a current in excess of the rated level, the circuit breaker is operated or the fuse is destroyed to disrupt the supply of power to the equipment. However, such a system is totally inadequate for providing protection in the event of a minor electrical fault resulting in a leakage current of perhaps several hundred milliamps to ground. Such a current frequently can be disastrous to a human being in contact with the ground path circuit. A typical example of such an instance may arise when a faulty piece of kitchen equipment or bathroom equipment is utilized having a leakage current of several hundred milliamps. When the user is in contact with the equipment and standing on a moist floor he is exposed to a possibly fatal electrical shock due to the current flow of several hundred milliamps. Of course, such a small current level although potentially dangerous to a human being, would go undetected by conventional circuit breaker protective devices which are typically activated by a current in excess of 15 or 20 amperes. Similarly, in the health care filed a weakened cardiac patient, for example, may be connected to an electronic surveillance device such as electrocardiograph equipment or the like. This type of equipment is normally totally safe, but could be subject to small leakage currents under certain circumstances due to an electrical fault, improper grounding, etc., such a leakage current being of the order to 1 to 5 milliamps and being extremely difficult to detect. The equipment may be utilized for a period of time with no problem arising. However, in the event the patient were to contact a metallic bed frame, for example, with a part of his body, while in contact with the defective equipment, the patient could receive the leakage current through his body. Such a current level would remain undetected by the usual type of safety equipment and could be lethal in its affect upon the heart action of the weakened patient. A resultant examination of the deceased patient would very rarely reveal that the cause of death was defective equipment since it would be assumed that the disease of the heart, which was under treatment, had resulted in the heart stoppage since the affects of the minute electrical current would be similar to the actions of certain cardiac diseases. It may be readily appreciated that the above situation could be repeated numerous times without detection. Accordingly, it may be seen that some measure of protection against the affects of defective electrical equipment is extremely important.

Presently available devices for achieving such protection against the affects of ground leakage currents are relatively uncommon, extremely expensive, and may be subject to significant unreliability in use, as well as frequent nuisance tripping. Furthermore, such devices often lack the requisite degree of sensitivity and are typically relatively complex to install. For example, certain typical prior art apparatus of this type often utilized bulky differential transformer devices in conjunction with amplifiers in order to detect the presence of ground leakage currents. Such devices have been inadequate in use particularly in view of the frequent problems in the high signal to noise ratio which frequently led to undesired tripping of the distribution system circuit breaker. In addition, since such equipment was often unsatisfactory in use, it was frequently disconnected after purchase and installation due to the inconvenience caused by its unsatisfactory operation, even in instances where there was a need for equipment of this type to provide a measure of protection.

Accordingly, it is an object of the present invention to provide an improved electronic safety system.

It is another object of the present invention to provide an improved electronic safety system for detecting the presence of ground leakage currents from a load circuit.

It is still another object of the present invention to provide an improved electronic safety system adapted to be coupled to a conventional circuit breaker system for selectively disrupting the supply of power to a load in response to the presence of potentially harmful ground leakage currents from a load circuit.

It is a further object of the present invention to provide an improved electronic safety system for selectively disrupting the supply of power to a load circuit in response to the presence of ground leakage currents, which system is protected against nuisance triggering due to the occurrence of spurious signals and switching transients.

It is still a further object of the present invention to provide an improved electronic safety system for selectively disrupting the supply of power to a load in response to a fault in an electrical load circuit which causes the presence of ground leakage currents, which system is economical to fabricate, compact in appearance, inexpensive to operate, and durable in use.

Various additional objects and features of the present invention will be readily apparent from the following detailed description and accompanying drawings wherein:

FIG. 3 is a graph illustrating the sinusoidal AC line voltage being supplied to the load circuit;

FIG. 4 is a current-time graph illustrating a typical electrical energizing signal, utilized in conjunction with the system of present invention;

FIG. 5 is a graph of flux density versus magnetic field intensity illustrative of the operation of a portion of the system of the present invention;

FIG. 6 is a schematic circuit diagram of an alternate embodiment of the system illustrated in FIG. 2;

Figure 1:
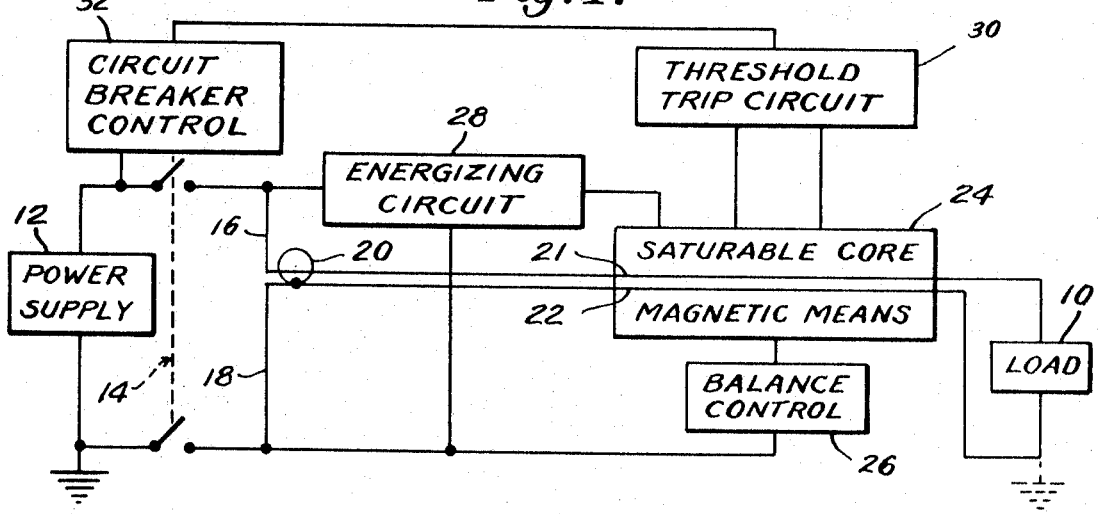
FIG. 1 is a block diagram of a safety system in accordance with the present invention.

Referring generally to the drawings, and particularly to FIG. 1, a load circuit 10 is illustrated coupled to a power supply 12 through a circuit breaker means 14 by first and second conductors 16 and 18 respectively. At least one portion of the conductors 16 and 18 intermediate the circuit breaker 14 and the load 10 comprises a section 20 of coaxial cable. The coaxial cable section 20 includes inner and outer conductors 21 and 22 electrically connected to the conductors 16 and 18 respectively and are inductively coupled to a saturable core magnetic means 24, which senses the presence of magnetic fields resulting from the passage of unequal currents through the inner and outer conductors 21 and 22 of the coaxial cable sections 20. Such unequal currents result when there is a leakage of current to ground from the load circuit 10, causing unequal currents to pass through the inner and outer conductors 21, 22. A balance control means 26 is also coupled to the saturable core magnetic means 24 in order to effect initial calibration thereof. In order to effect operation of the system, an energizing circuit 28 is provided for selectively energizing the saturable core magnetic means 24 during preselected time intervals so as to effect the establishment of a voltage output signal across the output of the saturable core magnetic means in response to the passage of unequal currents through the inner and outer conductors 21, 22 of the coaxial cable section 20. In addition, a threshold sensing circuit 30 is coupled to the output of the saturable core magnetic means 24 for detecting the presence of the voltage signal in order to provide an electrical signal which is coupled to a circuit breaker control 32 connected to the circuit breaker 14 for selectively disrupting the supply of power to the load.

Figure 2:
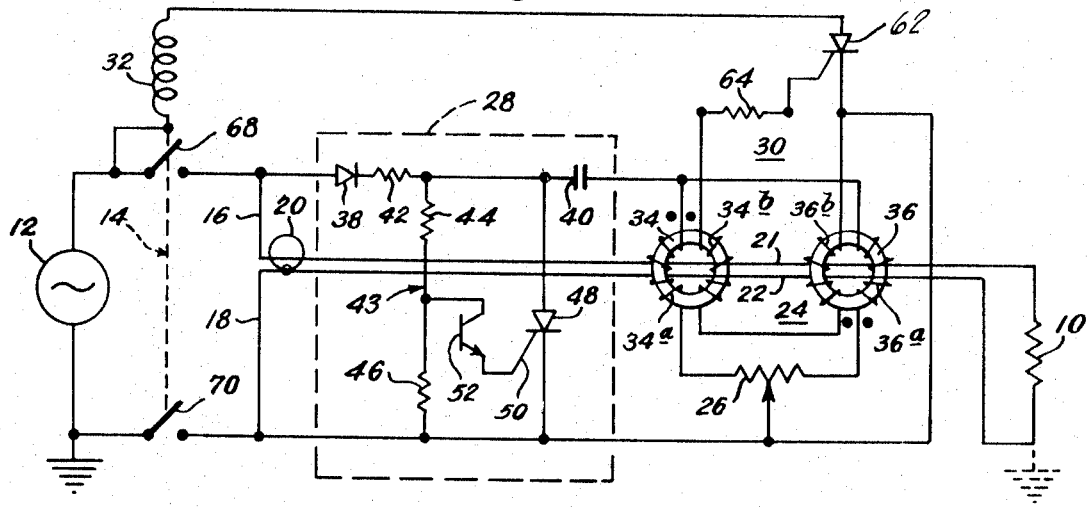
FIG. 2 is an electrical schematic circuit diagram of one embodiment of a system such as that illustrated in FIG. 1.

More particularly, referring to FIG. 2 which illustrates an electrical schematic circuit diagram of a preferred embodiment of the present invention, corresponding to the system illustrated in FIG. 1, it may be seen that the load 10 is represented as a resistance load, although a capacitive or inductive load may also be present, coupled to the power supply 12 by the conductors 16, 18 including the coaxial cable section 20. As illustrated in detail the conductor 16 is connected between one side of the power supply 12 and one side of the resistance load 10, through the inner conductor 21, while the conductor 18 is coupled between the opposite side of the power supply and the opposite side of the load through the outer conductor 22, which is also shown coupleable to ground to denote the existence of a path for leakage currents to ground. Such a configuration may be generally representative of a typical residential electrical branch system, for example, in which a power supply is coupled to a load through a circuit breaker by a pair of conductors. In such a system, the passage of leakage current may occur in response to an electrical fault in the load circuit, absent the provision of a safety system, in accordance with the principles of the present invention.

As shown in detail in FIG. 2, the conductors 16 and 18 include the coaxial cable section 20 which passes through and is inductively coupled to the saturable core magnetic means 24, which in the illustrated embodiment comprises first and second saturable core toroids 34 and 36 respectively. The conductors 16 and 18 are not electrically connected to the saturable core toroids 34, 36 but are electrically coupled to the load resistor 10, as shown. As a result, the saturable core toroids may be selectively energized, as will be explained in detail, independently of the load circuit 10, in order to detect the presence of unequal currents passing through the inner and outer conductors 21, 22 of the coaxial cable section 20 to the load 10, such unequal currents being the result of potentially harmful ground leakage currents from the load circuit.

In the presence of unequal currents, an affect on the magnetic field within the saturable core toroids is generated, resulting in the production of an output signal, which is effective to cause operation of the circuit breaker means 14 in order to disrupt the supply of power to the load.

More particularly, the first and second saturable core toroids 34, 36 each preferably comprises a toroid core having primary windings 34a and 36a and secondary windings 34b and 36b respectively wound on the toroid core, while at least a portion of the coaxial cable section 20 passes generally centrally through each of the respective toroid cores and is inductively coupled thereto. The coaxial cable section 20 functions as an additional primary winding for the toroids 34, 36 since the coaxial cable section is arranged to affect the magnetization of the toroid cores, when unequal electrical currents pass through the inner and outer conductors 21, 22 which are inductively coupled to the toroid cores. If desired, the secondary windings 34b, 36b may have a different number of turns than the primary windings 34a, 36a in order to vary the sensitivity of the system. In the illustrated embodiment, the primary windings 34a, 36a are electrically connected in parallel relationship with each other and are arranged such that opposite and generally equal, magnetic fields may be established in the toroid cores in response to energization by the primary windings. Thus, energization of the saturable core toroids does not affect the production of an output signal across the respective output windings 36a, 36b, since the magnetic fields established in each of the toroid cores are of opposite polarity and approximately equal in magnitude. In order to provide assurance of the absence of an output signal under usual operating conditions, the balance control 26, which comprises a variable resistor is connected intermediate the primary windings 34a and 36a of the first and second saturable core reactors in order to permit initial calibration thereof. Consequently, in the absence of an electrical fault or the like, resulting in the passage of unequal currents through the inner and outer conductors 21, 22 of the coaxial cable section 20 which would affect the magnetization of the toroid cores the reactors 34 and 36 may be energized by the energizing circuit and driven in a selected magnetic direction and selectively switched and driven in an opposite magnetic direction with no resultant output signal being developed across the secondary windings 34b and 36b, since the time-varying magnetic fields established are of generally equal magnitude and opposite polarity.

However, the flow of unequal currents through the inner and outer conductors 21, 22 as a result of ground current leakage produces an extremely weak magnetic field which may be detected by sensing its affect upon the relatively intense magnetization of the toroid cores established during rapid switching of the magnetic states of energization of the toroids, while achieving substantial amplification of the affect of the aforementioned weak magnetic field, as an indication of the presence of relatively minute ground leakage currents. Rapid and intense switching of the magnetic state of the toroids is effected by the energizing circuit 28, which is provided for initially magnetically biasing each of the toroid cores in one predetermined direction and then rapidly switching the direction of magnetic energization of the toroid cores by applying a sharp pulse signal in order to achieve rapid switching of the state of magnetization of the toroid cores in a second opposite predetermined direction. In the absence of a weak magnetic field applied to the toroid cores by the presence of unequal currents in the inner and outer conductors 21, 22 of the coaxial cable section 20, each of the toroid cores is driven into a state of magnetic saturation by the sharp pulse signal in the same time interval and the respective equal and opposite polarity magnetic fields established do not induce an output signal across the secondary windings 34b and 36b. However, in the presence of a weak magnetic field due to a difference in the current signals flowing in the inner and outer conductors 21, 22, each of the toroid cores is switched into magnetic saturation in a different time interval such that an output signal is established across the secondary windings 34b and 36b due to the affect of the weak magnetic field on the oppositely magnetized toroid cores.

The operation of the energizing circuit 28 and its effect on the toroid cores 34, 36 will now be explained in detail in conjunction with FIGS. 3–5 which illustrate the electrical signals being applied and the resultant pulse output signals produced by the energizing circuit 28, as well as a typical magnetization curve showing the magnetization of the toroid cores.

The energizing circuit 28 is preferably coupled to the power supply 12 through the circuit breaker 14, as shown. The energizing circuit includes a diode 38 which supplies half-wave rectified power to one terminal of a charging capacitor 40 through a resistor 42, which may be selected for establishing a desired magnetization level of the cores 34, 36. Although half-wave rectified power is utilized in the illustrated embodiment if desired, a full-wave bridge rectifier may be employed in place of the diode 38 in order to provide full-wave rectified power to the charging capacitor 40, as will be explained in detail hereinafter. As shown, the capacitor 40 is also coupled to a voltage divider 43, including a pair of resistors 44, 46, which are connected across a first selectively triggerable switch means 48 having a control electrode 50 connected to the tap of the voltage divider through a voltage threshold sensing device 52. The opposite terminal of the charging capacitor 40 is coupled to the saturable core magnetic means 24 as shown. In this connection, the capacitor 40 is connected to the parallel connected primary windings 34a and 36a of each of the toroid cores 34 and 36 respectively in order to supply energizing signals thereto. Discharge of the capacitor applies a high energy electrical pulse to the primary windings 34a, 36a, in order to magnetize the toroid cores and is controlled by the first selectively triggerable switch means 48, when a preselected voltage level has been established across the capacitor. In this regard, the switch means 48 preferably comprises a silicon-controlled rectifier with its gate electrode 50 coupled to the voltage threshold reference device 52, which prevents triggering of the silicon-controlled rectifier 48 until the preselected voltage level has been established across the capacitor 40. In this regard, the voltage threshold reference device 52 preferably comprises a baseless transistor, commonly referred to as a diac, connected between the capacitor 40 and the gate electrode 50 of the silicon-controlled rectifier through the voltage divider 43. The diac 52 remains nonconductive until its threshold voltage level is exceeded, which in the illustrated embodiment is effected in response to the establishment of the preselected voltage level across capacitor 40 and hence across the voltage divider 43, whereupon the diac is triggered and supplies a constant voltage level signal to the gate 50 to render the silicon-controlled rectifier 48 conductive.

During operation of the energizing circuit 28, the line voltage signal is initially supplied to the diode 38 through the closed circuit breakers 14, the line voltage being illustrated in FIG. 3 as a typical 110/115 volt, 60 Hz. sinusoidal voltage signal. If desired, of course, a suitable DC power source also may be utilized. As a result of the particular configuration of the energizing circuit, illustrated in FIG. 2, the output current from the capacitor 40 initially approximately follows the curve shown by the portion 56 of the curve illustrated in FIG. 4, depicting the time-varying current signal at the output of the capacitor 40, this signal being applied to the parallel-connected primary windings 34a and 36a as charge initially is stored in the capacitor. During this time interval, the storage of adequate charge on the capacitor 40 is assured by the non-conduction of the silicon-controlled rectifier 48, which is maintained nonconductive by the diac 52. Accordingly, an initial bias energizing signal is supplied to the primary windings 34a and 36a in accordance with the portion of the curve 56, illustrated in FIG. 4. Similarly, the application of this signal to the primary windings 34a and 36a, results in a sufficient current flow through the primary windings to cause their associated toroid cores to be bias magnetized in a first predetermined direction, while the requisite voltage level is being established across the capacitor 40. More particularly, referring to FIG. 5 which illustrates the magnetization curve of a typical saturable ferrite core toroid, such as the saturable core toroids 34, 36, it may be seen that both of the cores are initially at a remanent state represented by the point $a_1$, $b_1$, on the magnetization curve. However, as the voltage represented by the portion 56 is applied to the parallel-connected cores, the magnetization of the cores follows the magnetization curve to a point $a_2$ in regard to the core 34 and $b_2$ in regard to the core 36, as a typical example. For the sake of illustration, the points $a_2$ and $b_2$ are indicated at different points on the magnetization curve in order to represent the difference in magnetization of each of the respective cores 34 and 36 due to the passage of unequal currents through the inner and outer conductors 21, 22 due to the presence of ground leakage current. In this connection, in those instances in which no ground leakage current is present and equal currents are flowing in inner and outer conductors 21, 22, the points $a_2$ and $b_2$ are at identical locations on the magnetization curve, although for illustrative purposes, it is assumed that leakage current is present which affects the bias magnetization of the toroid cores so that the points $a_2$ and $b_2$ are not concomitant, but are located on different regions of the magnetization curve. As the voltage established across the capacitor 40 approaches the requisite preselected level, the voltage applied to the diac 52 by the voltage divider 43 causes the diac to reach its threshold voltage level. The diac 52 is thus triggered, applying a signal to the gate electrode 50 of silicon-controlled rectifier 48 sufficient to render the silicon-controlled rectifier conductive. As a result, a discharge path is provided for the capacitor 40 through the anode-cathode circuit of the silicon-controlled rectifier resulting in the establishment of an abrupt, high amplitude pulse of an opposite polarity from the initial bias signal, such as that shown by the portion 58 of the curve illustrated in FIG. 4. This pulse is applied to the respective parallel-connected input windings 34a and 36a. As a result of the application of this high energy pulse the toroid cores 34 and 36 are driven rapidly into magnetic saturation in a second predetermined direction opposite to the initial bias direction, the magnetization of each of the cores at a common time interval being designated by the points $a_3$, $b_3$ on the magnetization curve (FIG. 5). In the illustrative example, since each of the cores is driven into saturation from a different point on the magnetization curve, a different time interval is required for each of the cores to reach saturation. Similarly, it may be noted that in those circumstances, when the cores are driven into saturation in this manner from concomitant bias points, the time intervals required for each core to be driven into saturation are, of course, essentially identical. However, in the illustrative example in which it is assumed that unequal currents are flowing in the inner and outer conductors 21, 22 so that the cores have been initially differentially biased due to the affect of the weak magnetic field produced by the unbalanced current flow prior to being driven into saturation by the pulse 58, a different predetermined time interval is required for each of the cores to be driven into saturation. Accordingly, a different magnetic flux level is switched through each of the respective toroid cores in view of the differing initial bias levels and the differing time intervals required for reaching magnetic saturation. Consequently, a voltage signal is generated across the output windings 34b and 36b of the respective toroid cores. As the capacitor output current returns toward the zero level, as shown by the portion 60 of the curve of FIG. 4, the magnetization of each of the toroid cores again returns to the initial remanant state of magnetization $a_1$, $b_1$, of FIG. 5. Thus, it may be seen that the energizing circuit 28 affects rapid switching of the magnetic states of each of the toroid cores 34 and 36 in order to provide an extremely sensitive means for sensing an inequality in the currents flowing through the inner and outer conductors 21, 22 (due to ground leakage), as indicated by the affect of the magnetic field produced by such current inequality on the magnetic switching. It should be noted that, although the preceding description has been based upon a mode of operation in which the cores are initially biased in one direction and then abruptly driven into saturation in an opposite direction; if desired, the cores may be driven into saturation in the same direction as the initial bias state while achieving a similar desired result in sensing the affect on the switching caused by leakage currents.

In order to sense or detect the presence of an output signal across the secondary windings 34b, 36b, of the toroid cores 34, 36, the sensing circuit 30 is provided connected across the output of the secondary windings 34b and 36b as shown. In accordance with an important feature of the present invention in the illustrated embodiment, the coaxial cable section 20 is employed and functions to provide substantial protection against the affects of transient or spurious signals, which could produce an output signal, in view of the shielding provided by the coaxial cable structure. In this connection, the coaxial cable section may be only of a sufficient length to pass through the toroids 34, 36 or it may extend from the circuit breaker 14 to the load 10, depending upon the ultimate disposition contemplated for the system and the degree of shielding which is desired. The voltage sensing network 30 includes a second selectively energizable switch means 62 which is connected across the output of the secondary windings 34b and 36b and responds to the presence of a voltage output signal across these windings. The switch means 62 is arranged such that it is normally nonconductive in the absence of a sensed output signal appearing across the secondary windings 34b and 36b. Accordingly, in the absence of unequal currents flowing through the inner and outer conductors 21, 22 the switch means 62 remains nonconductive, while it is rendered conductive in response to preselected voltage output signal across the secondary windings. The second switch means 62 preferably comprises a silicon-controlled rectifier having its gate-cathode circuit connected across the output of the secondary windings 34b, 36b, as shown. In addition, the gate of the silicon-controlled rectifier 62 is connected to a gate resistor 64. If desired, various types of transient suppression networks may be provided connected across the gate-cathode circuit of the silicon-controlled rectifier 62 to prevent nuisance trigger. For example, a suitable RC filter network may be provided, appropriate counternetworks may be provided for maintaining the silicon-controlled rectifier nonconductive until a plurality of pulses in sequence are sensed, etc.

During operation of the network 30 in the presence of a ground leakage current which produces an inequality in the currents flowing through the inner and outer conductors 21, 22 establishing a preselected voltage level across the secondary windings, a sufficient signal is applied to the gate of the silicon-controlled rectifier 62 to render the silicon-controlled rectifier conductive. As a result of triggering or firing of the silicon-controlled rectifier 62, an output signal is provided which may be utilized for indicating the presence of a ground leakage current and/or providing protection against the affects of such a leakage current, such as by effecting operation of the circuit breaker 14.

More particularly, in the illustrated embodiment, the circuit breaker control 32, which controls operation of the circuit breaker 14, preferably comprises a selectively energizable relay coil which is coupled between the power supply 12 and the anode-cathode circuit of the silicon-controlled rectifier 62 such that conduction or energization of the silicon-controlled rectifier 62 energizes the relay coil 32. In addition, the circuit breaker 14 is illustrated as comprising a pair of relay contacts 68 and 70 operatively connected to the relay coil 32 and adapted to be opened in response to energization of the relay coil 32 caused by the conduction or energization of the silicon-controlled rectifier 62. Thus, as a result of the establishment of an output signal across the secondary windings 34b and 36b the silicon-controlled rectifier 62 is rendered conductive, energizing the relay coil 32, effecting opening of the contacts 68 and 70, and thereby disrupting the supply of power to the load so as to afford the requisite safety protection.

By suitably adjusting component values in the system, it is possible to achieve an operative sensitivity for the system in a desired range. For example, it is generally advantageous to assure tripping of the circuit breaker in response to a leakage current to ground of the order to 5 milliamps or greater, since such a current level could be sufficient in certain instances to be potentially harmful. If desired, the balance control resistor 26 may be utilized for selectively varying the trip point of the system, while sensitivity is dependent in part upon the properties of the toroid cores utilized. In this connection it is generally desirable to utilize toroid cores which have a nearly rectangular hysteresis curve in order to achieve a relatively high degree of sensitivity. Various types of ferrite core and tape wound core toroids have been used successfully in this regard. In addition, it has been found desirable in certain instances to utilize toroid cores having multiple turn windings with a unity turns ratio of primary to secondary windings and with both the first and second toroid cores having the same number of turns.

Although in the system illustrated in FIG. 2, the respective windings of each of the toroids are shown as electrically connected with each other in parallel relationship, in certain instances it may be advantageous to provide a similar system in which the respective windings are electrically connected in series relationship. An alternate embodiment of the present invention, illustrating such a configuration, is shown in FIG. 6. In addition, such a system is particularly advantageous in situations where core material is available, having a relatively square hysteresis curve in order to achieve efficient operation.

Referring now in detail to the embodiment illustrated in FIG. 6 wherein corresponding parts have corresponding reference numerals in comparison with FIG. 2, it may be seen that the load 10 is similarly coupled to the power supply 12 through the circuit breaker means 14. In addition, the first and second conductors 16 and 18 are coupled between the power supply and the load, while the coaxial cable section 20 including the inner and outer conductors 21, 22 is disposed intermediate the power supply and the load and passes generally centrally through first and second saturable core toroids 72 and 74 respectively, inductively coupled therewith. Once again the coaxial cable section 20 may extend from the circuit breaker to the load or may comprise a relatively short portion extending only through the toroid cores with individual conductors extending from opposite ends of the coaxial cable section to the circuit breaker and to the load circuit respectively.

Each of the toroid cores 72 and 74 includes a primary winding 72a and 74a, and a secondary winding 72b and 74b respectively. The primary windings 72a and 74a are electrically connected in series relationship, while the secondary windings 72b and 74b are similarly electrically connected in series relationship. In addition, an energizing circuit 76 is connected between the power supply 12 and the saturable core toroids 72 and 74 to supply energization thereto similarly to the energizing circuit 28, but the energizing circuit 76 is somewhat modified in comparison with the energizing circuit 28 in view of the series connection of the toroid cores. However, operation of the energizing circuit 76 is quite similar to the operation of the energizing circuit 28, and similarly is arranged to provide an output signal, such as that illustrated in FIG. 4. The energizing circuit 76 also includes the half-wave rectifier diode 38 coupled to the charging capacitor 40 through the resistor 42. The energizing circuit 76 also includes the silicon-controlled rectifier 48 having its gate 50 connected to the voltage threshold sensing device 52, which similarly preferably comprises a diac. The diac 52 is connected between the resistor 42 and the capacitor 40, as shown, and is also connected to a gate resistor 78, which is connected across the gate-cathode circuit of the silicon-controlled rectifier 48. In addition, a damping resistor 79 is connected between the anode of the silicon-controlled rectifier 48 and the common junction between the capacitor 40 and resistor 42. The diac 52 applies a trigger signal to the gate 50 to render the silicon-controlled rectifier 48 conductive when the preselected voltage level is established across the capacitor 40 to effect the discharge thereof through the anode-cathode circuit of the silicon-controlled rectifier. The balance control 26, which again comprises a variable resistor, is connected intermediate the serially connected primary windings 72a and 74a, and may be employed for selectively varying the trip point of the system, as previously mentioned.

The voltage sensing network 30 is similarly provided for detecting the presence of voltage output signals developed across the secondary windings 72b, 74b due to the passage of unequal currents through the inner and outer conductors 21, 22 of the coaxial cable section 20. The voltage sensing network 30 includes the second selectively energizable switch means 62 preferably comprising a silicon-controlled rectifier, as previously explained in connection with FIG. 2, and if desired, may include the interconnected resistor 64 and capacitor 66 coupled to the gate electrode of the silicon-controlled rectifier 62 in order to function as a filter network for preventing the nuisance triggering.

Conduction or energization of the silicon-controlled rectifier 62 is similarly effective to effect operation of the circuit breaker means 14 as in connection with the FIG. 2 embodiment. In this regard, the anode of the silicon-controlled rectifier 62 is coupled directly to the selectively energizable relay coil 32, while the relay coil is operatively connected to the normally closed relay contacts 68 and 70 which are opened in response to energization of the relay coil 32 to effect disruption of the power being supplied to the load 10.

Operation of the embodiment illustrated in FIG. 6 is essentially identical to that of the embodiment illustrated in FIG. 2 in that the energizing circuit 76 effects the application of an initial bias signal to the primary windings 72a and 74a of the toroid cores 72 and 74 so as to initially magnetically bias the cores in one magnetic direction. The energizing circuit similarly applies a high energy pulse (as indicated by the portion 58 of the curve in FIG. 4) in order to abruptly drive the cores into saturation in the opposite magnetic direction. In the absence of a magnetic field due to the passage of unequal currents through the inner and outer conductors 21, 22 of the coaxial cable section 20, the toroid cores 72 and 74 are driven into saturation in substantially the same time interval so that no output signal is developed across the secondary windings 72b and 74b and the silicon-controlled rectifier 62 remains nonconductive. However, in the presence of a leakage current to ground a magnetic field is established which affects the magnetization of the toroid cores such that each of the cores is driven into saturation in a different time interval, resulting in the establishment of a voltage signal across the serially connected secondary windings 72b and 74b, as previously explained. This voltage signal is applied to the gate of the silicon-controlled rectifier 62 to render the silicon-controlled rectifier 62 conductive, thereby energizing the relay coil 32 and effecting opening of the relay contacts 68 and 70 so as to disrupt the power being supplied to the load. As a result of the serial connection of the saturable core reactors 72, 74 in the embodiment illustrated in FIG. 6, leakage currents of the order to 200 microamperes may be sensed during the passage of load currents of the order of 20 amperes.

Figure 7:
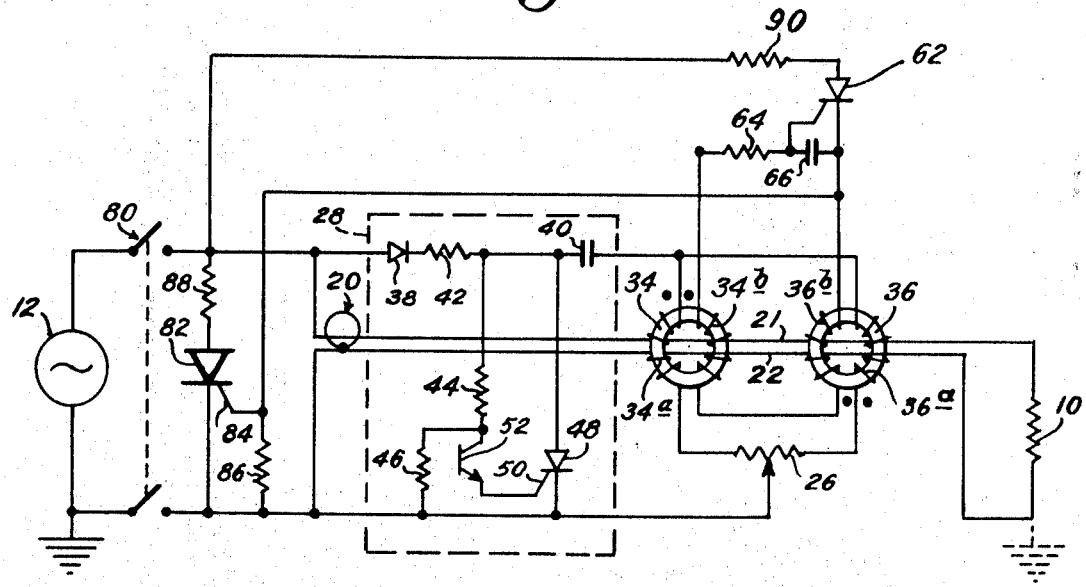
FIG. 7 is a schematic circuit diagram of another alternate embodiment of a system in accordance with the present invention.

Referring to FIG. 7, an alternative embodiment of the present invention is illustrated wherein corresponding elements are indicated by the same reference numerals as employed in connection with FIG. 2. It may be seen that the system illustrated is quite similar to that shown in FIG. 2 except for a modification in the manner in which the output of the saturable core reactor means is utilized for selectively disrupting the power to the load circuit 10, whereby operation is affected on alternate half-cycles of applied power. More particularly, in the embodiment illustrated in FIG. 7, a circuit breaker means 80 is provided for coupling the power supply 12 to the load circuit 10, while a selectively energizable shunt switch means 82 having a control electrode 84 is provided for controlling the operation of the circuit breaker in response to output signals supplied by conduction of the silicon-controlled rectifier 62 due to the presence of ground leakage currents, as previously explained. In this connection, the switch means 82 preferably comprises a semiconductor switch, such as a silicon-controlled rectifier having its anode-cathode circuit connected in shunt across the circuit breaker 80 and having its control or gate electrode 84 connected to the cathode of the silicon-controlled rectifier 62 for effecting firing or conduction thereof in response to conduction of the silicon-controlled rectifier 62. In addition, a gate resistor 86 is connected between the gate and cathode of the silicon-controlled rectifier 82. The anode of the silicon-controlled rectifier 82 is coupled to the circuit breaker 80 through a relatively small resistance overload resistor 88, which preferably has a resistance value of the order of one ohm or less. The anode of silicon-controlled rectifier 62 is coupled to circuit breaker 80 through a current-limiting protective resistor 90. Since the silicon-controlled rectifier 82 has its anode-cathode circuit shunting the circuit breaker means 80, when the silicon-controlled rectifier 82 is rendered conductive in response to the presence of a ground leakage current, a relatively large electrical signal is caused to flow from the power supply 12 through the low resistance overload resistor 88 and through the anode-cathode circuit of silicon-controlled rectifier 82, which results in the occurrence of an overload of the circuit breaker means 80, thereby causing opening of the circuit breaker and disruption of the power being supplied.

Figure 8:
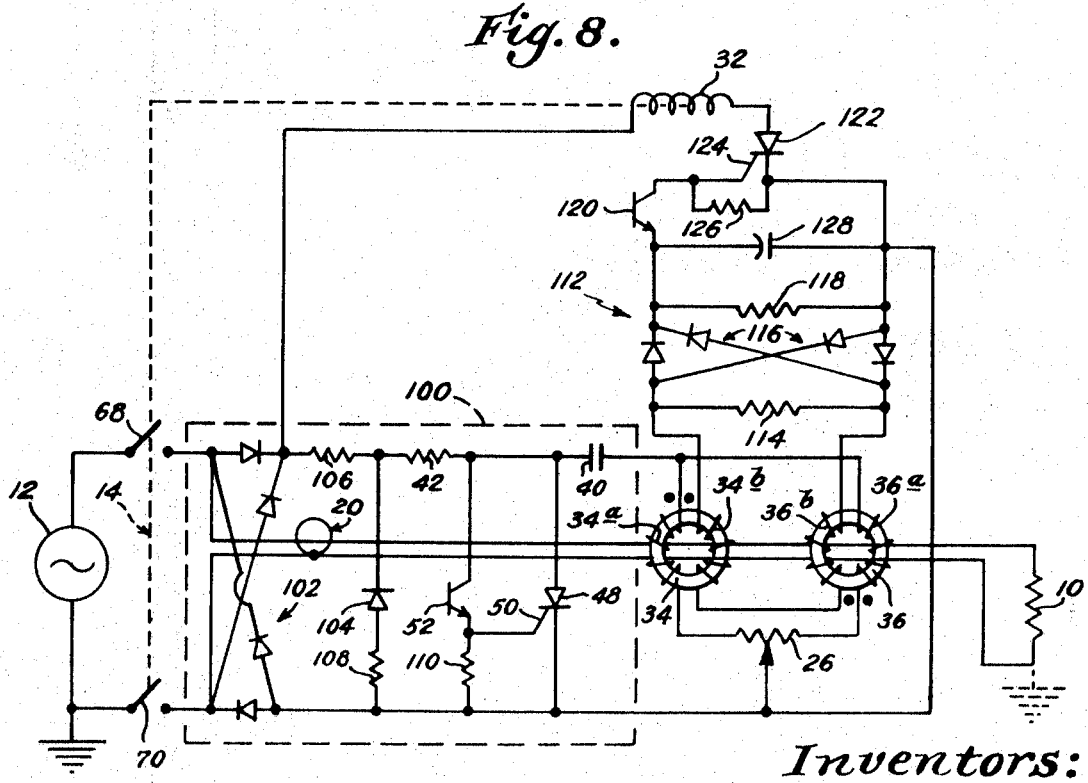
FIG. 8 is a schematic circuit diagram of still another alternate embodiment of a system in accordance with the present invention.

In those instances in which it is desired to control operation of the protective system on both half-cycles of applied power an embodiment such as that illustrated in FIG. 8 may be utilized. In this embodiment, substantially increased speed of operation for disrupting the power being supplied to a load in response to a ground leakage signal may be achieved. More particularly, this embodiment is generally similar to the system described in FIG. 2 and includes the coaxial cable section 20 passing generally centrally through and inductively coupled to the saturable core toroids, 34 and 36 and connected to the load 10 for supplying power from the power supply 12. Primary windings 34a and 36a connected in parallel relationship and secondary windings 34b and 36b are provided for the toroid cores 34 and 36 respectively, while the balance control resistor 26 is connected between the primary windings. The previously described magnetic switching for sensing the presence of unequal currents flowing through the inner and outer conductors 21, 22 due to ground leakage current is effected in a manner similar to that described in connection with FIG. 2, but is accomplished on both half-cycles of applied power, rather than on alternate half-cycles. In this connection, an energizing circuit 100 is utilized which is somewhat similar to the energizing circuit 28, and is arranged for providing output signals, such as illustrated in FIG. 4 for application to the toroid cores. However, a full-wave diode bridge rectifier 102 is utilized instead of the half-wave rectifier diode 38 so that the initial magnetic biasing and rapid magnetic switching of the toroid cores may be effected on both half-cycles due to the full-wave rectified power signal applied to the capacitor 40. In order to maintain a substantially constant reference voltage output a voltage regulating device 104, such as a zener diode, is connected across the output of the bridge rectifier 102, as shown, through a current limiting protective resistor 106 at one terminal and through a wave-shaping resistor 108 at its opposite terminal. The capacitor 40 is connected to the zener diode 104 at the output of the bridge rectifier 102 by the resistor 42, which, as previously explained, functions primarily for establishing a desired magnetization level for the cores 34, 36. In this regard, as shown, the capacitor is connected to the parallel-connected primary windings 34a, 36a, of the toroid cores 34, 36 for supplying energizing signals thereto. The selectively triggerable silicon-controlled rectifier 48 is connected to the junction of capacitor 40 and resistor 42 for controlling the discharge of the capacitor 40 in order to energize the cores as previously explained. The gate 50 of the silicon-controlled rectifier is connected to a common junction between a gate resistor 110, connected across the cathode-gate terminals of the silicon-controlled rectifier, and the voltage threshold device or diac 52 connected across the anode-gate terminals of the silicon-controlled rectifier. The diac 52 again functions to inhibit triggering of the silicon-controlled rectifier until the preselected voltage level is established across the capacitor 40 whereupon the diac 52 is triggered and applies a constant voltage level signal to the gate 50 to render the silicon-controlled rectifier 48 conductive.

The output current supplied by the capacitor 40 to the primary windings 34a, 36a is similar to that described in connection with FIG. 2. More particularly, an initial bias signal is supplied to the primary windings, as indicated by portion 56 of the curve illustrated in FIG. 4, to bias magnetize the cores, while the requisite preselected voltage level is being established across the capacitor. As this voltage level is approached, the diac 52 reaches its threshold level and is triggered rendering the silicon-controlled rectifier 48 conductive to provide a discharge path for the capacitor and establishing the high amplitude pulse of opposite polarity from the bias signal indicated by the portion 58 of FIG. 4 for driving the cores into magnetic saturation so that the affect on the switching of the cores due to leakage current may be sensed, as previously explained. However, in the embodiment illustrated in FIG. 8, this procedure is then repeated on the succeeding half-cycle of applied power due to the employment of full-wave rectified power, rather then omitting sensing during the succeeding half-cycle, as in the FIG. 2 embodiment which utilizes half-wave rectified power.

Sensing or detection of an output signal across the secondary windings 34b, 36b as an indication of the presence of ground leakage current is effected by the provision of a sensing network 112 connected across the secondary windings. The sensing network 112 includes a voltage limiting resistor 114 connected across the serially connected secondary windings 34b, 36b. The resistor 114 is connected across the input of a full-wave bridge rectifier circuit 116, which receives the sensed output signals developed across the secondary windings 34b, 36b in response to the presence of ground leakage currents. A relatively high-resistance output resistor 118 is connected across the output of the full-wave bridge rectifier 116 for applying output signals from the bridge rectifier 116 to a voltage threshold sensing device 120, such as a diac, which remains nonconductive until a predetermined voltage is applied thereto. A selectively energizable switch means 122, preferably having a control terminal or gate 124 is provided, the gate 124 being coupled to the output resistor 118 through the diac 120. The silicon-controlled rectifier 122 is adapted to be energized to produce an output signal in response to the establishment of the requisite output signal across the secondary windings 34b, 36b, which causes the development of a sufficient voltage level across the output resistor 118 to trigger the diac 120, which, in turn, renders the silicon-controlled rectifier 122 conductive. In addition, a gate resistor 126 is connected to the gate 124 of the silicon-controlled rectifier to aid in stabilizing its operation, and a filter capacitor 128 is preferably connected across the output of the bridge rectifier 116. The filter capacitor 128 in conjunction with the impedance of the secondary windings 34b, 36b serves to filter out spurious signals to prevent nuisance triggering of the silicon-controlled rectifier 122.

As shown, the anode-cathode circuit of the silicon-controlled rectifier 122 is serially connected to the selectively energizable relay coil 32 comprising the circuit breaker control. The relay coil 32 is operatively connected to its associated relay contacts 68 and 70, and controls operation of the circuit breaker 14, as previously explained. Accordingly, in operation upon the establishment of an output signal across the secondary windings 34b, 36b due to ground leakage currents, the silicon-controlled rectifier 122 is rendered conductive, energizing the relay coil 32, effecting opening of the relay contacts 68, 70 and thereby disrupts the supply of power to the load 10 so as to provide the desired protection.

It should be noted that the above-described embodiments, although illustrating the provision of a safety system for protection in connection with AC signals are equally applicable for use in providing similar protection in connection with DC signals in which an inequality between a DC input and return signal due to the presence of leakage current could be similarly sensed by its affect on the magnetization of a similar saturable core magnetic means in the manner described in the preceding embodiments.

Accordingly, several embodiments of an electronic safety system have been described in which the presence of extremely minute potentially harmful leakage currents, ordinarily undetected by conventional protective equipment, are detected and caused to effect disruption of the power being supplied to a load.

Various changes and modifications in the above-described invention will be readily apparent to those skilled in the art and any such changes or modifications are deemed to be within the spirit and scope of the appended claims.

We claim:

1. An electronic safety system for detecting the presence of an electrical fault resulting in the leakage of electrical current from a load circuit to ground comprising
   means for coupling the load circuit to a power supply including a section of coaxial cable to minimize the affects of spurious electrical signals, said coaxial cable having inner and outer electrical conductors, one of said electrical conductors being coupled to ground to define a path for leakage currents from the load circuit to ground,
   selectively energizable saturable core magnetic means electrically coupled to the power supply and inductively coupled to a portion of said section of coaxial cable intermediate the load circuit and the power supply, said saturable core magnetic means being adapted to respond to the passage of unequal currents through said inner and outer electrical conductors of said coaxial cable section,
   means for energizing said saturable core magnetic means in order to establish preselected magnetic fields, said preselected magnetic fields being of opposite polarity and being substantially equal during the passage of essentially equal currents through said inner and outer conductors of said coaxial cable section and being affected by the passage of unequal currents through said inner and outer conductors of said coaxial cable section in a manner systematically related to the magnitude of the leakage current,
   means for producing an electrical signal in response to the affect on said magnetic fields, and
   means for sensing the presence of said electrical signal as an indication of current leakage from the load circuit.

2. An electronic safety system in accordance with claim 1 wherein said saturable core magnetic means comprise first and second saturable core toroids electrically coupled to each other in series opposition.

3. An electronic safety system in accordance with claim 2 wherein said energizing means is adapted to establish an initial magnetic bias in said first and second saturable core toroids and to then supply an electrical pulse signal driving said first saturable core reactor into magnetic saturation in a first predetermined time interval and driving said second saturable core reactor into magnetic saturation in a second predetermined time interval, said first and second predetermined time intervals being essentially equal during the passage of substantially equal currents through said inner and outer conductors of said coaxial cable section and being unequal during the passage of unequal currents through said inner and outer conductors of said coaxial cable section so as to effect the production of an electrical signal having magnitude related to the differential time interval.

4. An electronic safety system in accordance with claim 3 wherein said energizing circuit includes means for providing half-wave rectified electrical power, a storage capacitor coupled between said means for providing half-wave rectified power and said saturable core toroids, and a selectively triggerable switch means having a control electrode, said switch means being coupled to said capacitor for effecting relatively rapid discharge thereof in order to produce a relatively high energy pulse for energizing said first and second saturable core toroids.

5. An electronic safety system in accordance with claim 4 wherein said selectively triggerable switch means comprises a silicon-controlled rectifier, and a voltage threshold device is provided coupled between said capacitor and said control electrode for triggering said silicon-controlled rectifier in response to the establishment of a preselected voltage level across said capacitor to define a discharge path for said capacitor through said silicon-controlled rectifier in order to effect the production of said high energy pulses.

6. An electronic safety system in accordance with claim 5 wherein said means for sensing the presence of said electrical signal comprises a selectively energizable switch circuit connected across the output of said first and second saturable core toroids, said selectively energizable switch circuit being adapted to be rendered conductive in response to the presence of said electrical signal.

7. An electronic safety system in accordance with claim 6 wherein a selectively operable circuit breaker means is coupled to said switch circuit for selectively disrupting the supply of power to said load circuit in response to conduction of said switch circuit.

8. An electronic safety system in accordance with claim 7 wherein said circuit breaker means comprises a circuit breaker connected across the power supply and a normally nonconductive semiconductor switch is connected in shunt across said circuit breaker, said semiconductor switch having a control element coupled to said switch circuit for effecting conduction of said semiconductor switch in response to conduction of said switch circuit so as to establish a low-resistance conduction path across said circuit breaker in order to effect opening thereof in response to continued conduction of said semiconductor switch.

9. An electronic safety system in accordance with claim 3 wherein said energizing circuit includes means for providing full-wave rectified electrical power so as to effect magnetization of said toroids during successive half cycles of applied power, a storage capacitor coupled between said means for providing full-wave rectified power and said saturable core toroids, and a selectively triggerable switch means having a control electrode, said switch means being coupled to said capacitor for effecting relatively rapid discharge thereof in order to produce relatively high energy pulses for energizing said first and second saturable core toroids.

10. An electronic safety system in accordance with claim 9 wherein said selectively triggerable switch means comprises a silicon-controlled rectifier, and a voltage threshold device is provided coupled between said capacitor and said control electrode for triggering said silicon-controlled rectifier in response to the establishment of a preselected voltage level across said capacitor to define a discharge path for said capacitor through said silicon-controlled rectifier in order to effect the production of said high energy pulses.

11. An electronic safety system in accordance with claim 10 wherein said means for sensing the presence of said electrical signal comprises a selectively energizable switch circuit connected across the output of said first and second saturable core toroids, said selectively energizable switch circuit being adapted to be rendered conductive in response to the presence of said electrical signal.

12. An electronic safety system in accordance with claim 11 wherein a selectively operable circuit breaker means is coupled to said switch circuit for selectively disrupting the supply of power to said load circuit in response to conduction of said switch circuit.

13. An electronic safety system in accordance with claim 12 wherein said switch circuit includes a voltage sensing resistor connected across the output of said first and second saturable core toroids, another full-wave bridge rectifier network connected across said resistor, voltage threshold sensing trigger means coupled to the output of said another bridge rectifier network, and another selectively triggerable silicon-controlled rectifier having its gate coupled to said trigger means, said another silicon-controlled rectifier being adapted to be rendered conductive in response to the presence of said electrical signal.

14. An electronic safety system for selectively disrupting the supply of power to a load circuit in response to the leakage of electrical current to ground comprising
means for coupling the load circuit to a source of electrical power, said coupling means including a section of coaxial cable having inner and outer conductors, one of said conductors being coupleable to ground to define a path for leakage currents from the load to ground,
first and second selectively energizable saturable core transformers electrically coupled to the source of power and inductively coupled to a portion of said section of coaxial cable intermediate the load and the source of power,
energizing circuit means connected between the source of power and said saturable core transformers for selectively energizing said first saturable core transformers in a first predetermined time interval and said second saturable core transformer in a second predetermined time interval during the passage of unequal currents through said inner and outer conductors of said coaxial cable section,
means for sensing a voltage output signal developed across the output of said saturable core transformers in response to the presence of a difference between said first and said second predetermined time intervals as an indication of the flow of leakage current to ground, and
selectively operable circuit breaker means coupled to said sensing means for disrupting the power being supplied to said load circuit in response to the presence of said voltage output signal.

15. An electronic safety system for selectively disrupting the supply of power to a load circuit in response to the leakage of electrical current to ground comprising
means for coupling the load circuit to a source of electrical power, said coupling means including a section of coaxial cable having inner and outer electrical conductors, one of said conductors being coupleable to ground to define a path for leakage currents from the load to ground,
first and second selectively energizable saturable core transformers electrically coupled to the source of power and inductively coupled to said inner and outer electrical conductors at a location intermediate the load and the source of power, an energizing circuit connected between the source of power and said first and second saturable core transformers for initially effecting magnetic biasing of each of said saturable core transformers in a first direction in a first predetermined time interval, said saturable core transformers initially being differentially magnetically biased in response to the passage of unequal electrical currents through said inner and outer conductors inductively coupled thereto, and for subsequently effecting magnetic saturation of said first and second saturable core transformers in a second opposite direction in a second predetermined time interval, said first and second time intervals being unequal in response to the initial establishment of differential magnetic biasing, whereby an electrical output signal is established across said saturable core transformers,
means responsive to said electrical output signal connected across the output of said saturable core transformers for providing a trigger signal in response to said electrical output signal, and
selectively operable circuit breaker means for interrupting the supply of power to the load in response to the provision of said trigger signal.

16. An electronic safety system in accordance with claim 15 wherein said first and second saturable core transformers include first and second toroid cores respectively each having a primary winding and a secondary winding, said primary windings being electrically coupled to said energizing circuit, said secondary windings being electrically connected to said means responsive to said electrical output signal, and said inner and outer conductors of said coaxial cable section pass generally centrally through said toroids inductively coupled thereto and adapted to affect the magnetization thereof.

17. An electronic safety circuit in accordance with claim 16 wherein said energizing circuit includes a means for supplying rectified AC power, a capacitor connected between said means for supplied rectified AC power and said primary windings of said toroids, means coupled to said capacitor to assure the storage of a preselected voltage thereacross, a selectively energizable switch means having a control electrode, said switch means being coupled to said capacitor, and a voltage threshold sensing device coupled to said control electrode and to said capacitor to effect energization of said switch means in response to the establishment of said preselected voltage level across said capacitor to define a discharge path for said capacitor through said switch means, whereby said toroids are initially magnetically biased in said first direction during nonconduction of said switch means and abruptly driven into magnetic saturation in said second direction in response to energization of said switch means.

18. An electronic safety system in accordance with claim 17 wherein said switch means comprises a first silicon controlled rectifier, said means responsive to said electrical output signal comprises a second silicon-controlled rectifier having its gate-cathode circuit coupled across said secondary windings, whereby the establishment of said electrical output signal across said secondary windings is effective to energize said second silicon-controlled rectifier to provide said trigger signal, and said selectively operable circuit breaker means includes a selectively energizable relay coil adapted to be energized by said trigger signals and a pair of relay contacts operatively connected to said relay coil, said relay contacts being connected between the source of power and the load for disrupting the supply of power to the load in response to energization of said relay coil.

19. An electronic safety system in accordance with claim 17 wherein said switch means comprises a first silicon-controlled rectifier, said means responsive to said electrical output signal comprises a second silicon-controlled rectifier having its gate cathode circuit connected across said secondary windings, whereby the establishment of said electrical output signal across said secondary windings is effective to energize said second silicon-controlled rectifier to provide said trigger signal, and a third selectively energizable silicon-controlled rectifier is connected in shunt across said circuit breaker, said third silicon-controlled rectifier being coupled to said second silicon-controlled rectifier and being adapted to be rendered conductive in response to energization of said second silicon-controlled rectifier so as to define a low-resistance shunt conduction path across said circuit breaker in order to effect opening thereof in response to conduction of said third silicon-controlled rectifier.

* * * * *